United States Patent
Li et al.

(10) Patent No.: US 7,913,773 B2
(45) Date of Patent: Mar. 29, 2011

(54) BIDIRECTIONAL DRILL STRING TELEMETRY FOR MEASURING AND DRILLING CONTROL

(75) Inventors: Qiming Li, Sugar Land, TX (US); Brian Clark, Sugar Land, TX (US); Shyam B. Mehta, Missouri City, TX (US); Remi Hutin, New Ulm, TX (US); Christopher P. Reed, West University Place, TX (US); David Santoso, Sugar Land, TX (US); Lise Hvatum, Katy, TX (US); Raghu Madhavan, Houston, TX (US); Jean-Marc Follini, Houston, TX (US); Geoffrey C. Downton, Minchinhampton (GB); Walter D. Aldred, Thriplow (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 840 days.

(21) Appl. No.: 11/498,845

(22) Filed: Aug. 3, 2006

(65) Prior Publication Data

US 2007/0029112 A1    Feb. 8, 2007

Related U.S. Application Data

(60) Provisional application No. 60/705,326, filed on Aug. 4, 2005, provisional application No. 60/708,561, filed on Aug. 16, 2005.

(51) Int. Cl.
*E21B 47/12* (2006.01)
(52) U.S. Cl. ............ 175/40; 175/24; 175/50; 340/854.4
(58) Field of Classification Search ................. 175/24, 175/40, 50; 340/854.4, 854.5, 854.9, 855.1
See application file for complete search history.

(56) References Cited

U.S. PATENT DOCUMENTS 3,807,502 A    4/1974    Heilhecker et al.
(Continued)

FOREIGN PATENT DOCUMENTS

EP    0636763    2/1995
(Continued)

OTHER PUBLICATIONS

MacDonald, Four Different Systems Used for MWD, Oil and Gas Journal, pp. 115 to 124, Apr. 3, 1978.

*Primary Examiner* — Giovanna C Wright
(74) *Attorney, Agent, or Firm* — David J. Smith; Dave R. Hofman; Brigitte L. Echols

(57) ABSTRACT

The disclosure has application for use in conjunction with an operation of drilling an earth borehole using: a drilling rig, a drill string having its generally upper end mechanically coupleable with and suspendable from the drilling rig, and a bottom hole assembly adjacent the lower end the drill string, the bottom hole assembly including a drill bit at its lower end. A method is set forth for obtaining information about at least one parameter sensed at the bottom hole assembly, including the following steps: providing at least one measuring device in the bottom hole assembly, the at least one measuring device producing measurement data representative of a measured condition at the bottom hole assembly; providing an uphole processor system at the earth's surface; providing a drill string telemetry system coupled with the at least one measuring device and coupled with the uphole processor system; and transmitting the data from the measuring device to the uphole processor system via the drill string telemetry system.

25 Claims, 12 Drawing Sheets

U.S. PATENT DOCUMENTS

| | | | |
|---|---|---|---|
| 3,957,118 | A | 5/1976 | Barry et al. |
| 4,126,848 | A | 11/1978 | Denison |
| 4,605,268 | A | 8/1986 | Meador |
| 4,806,928 | A | 2/1989 | Veneruso |
| 4,901,069 | A | 2/1990 | Veneruso |
| 5,052,941 | A | 10/1991 | Hernandez-Marti |
| 5,278,550 | A | 1/1994 | Rhein Knudsen et al. |
| 5,521,592 | A | 5/1996 | Veneruso |
| 5,868,210 | A | 2/1999 | Johnson et al. |
| 5,971,072 | A | 10/1999 | Huber et al. |
| 6,233,524 | B1 | 5/2001 | Harrell et al. |
| 6,272,434 | B1 | 8/2001 | Wisler et al. |
| 6,396,276 | B1 | 5/2002 | Van Steenwyk et al. |
| 6,445,307 | B1 | 9/2002 | Rassi et al. |
| 6,641,434 | B2 | 11/2003 | Boyle et al. |
| 6,655,460 | B2 * | 12/2003 | Bailey et al. .................. 166/301 |
| 6,729,399 | B2 | 5/2004 | Follini et al. |
| 6,857,486 | B2 * | 2/2005 | Chitwood et al. ............ 175/104 |
| 6,920,085 | B2 | 7/2005 | Finke et al. |
| 7,040,415 | B2 | 5/2006 | Boyle et al. |
| 7,204,324 | B2 | 4/2007 | Gleitman et al. |
| 2004/0217880 | A1 * | 11/2004 | Clark et al. ................ 340/854.9 |
| 2005/0034895 | A1 * | 2/2005 | Sawyer ........................... 175/45 |
| 2005/0035875 | A1 * | 2/2005 | Hall et al. .................. 340/853.1 |
| 2005/0046588 | A1 | 3/2005 | Wisler et al. |
| 2005/0087368 | A1 | 4/2005 | Boyle et al. |
| 2005/0150689 | A1 | 7/2005 | Jogi et al. |
| 2005/0207279 | A1 | 9/2005 | Chemali et al. |
| 2007/0159351 | A1 | 7/2007 | Madhavan et al. |

FOREIGN PATENT DOCUMENTS

| | | | |
|---|---|---|---|
| GB | 2419903 | | 5/2006 |
| RU | 2040691 | | 2/1992 |
| RU | 2140527 | | 12/1997 |
| WO | 9014497 | | 11/1990 |
| WO | 9741330 | | 11/1997 |
| WO | 02065158 | | 8/2002 |
| WO | WO 2004072437 | A1 * | 8/2004 |
| WO | 2007016687 | | 2/2007 |

* cited by examiner

BIDIRECTIONAL DRILL STRING TELEMETRY FOR MEASURING AND DRILLING CONTROL

PRIORITY CLAIM AND RELATED APPLICATIONS

The present Application claims priority from U.S. Provisional Patent Application No. 60/705,326, filed Aug. 4, 2005, and also claims priority from U.S. Provisional Patent Application No. 60/708,561, filed Aug. 16, 2005, and both said U.S. Provisional Patent Applications are incorporated herein by reference. The present Application contains subject matter that relates to subject matter disclosed in copending U.S. patent application Ser. No. 11/995,027, titled "Interface and Method for Wellbore Telemetry System" (hereinafter "the '027 Application") and U.S. patent application Ser. No. 11/498,847, titled "Surface Communication Apparatus and Method for Use with Drill String Telemetry" (hereinafter "the '847 application"), both filed on Aug. 3, 2006, and both assigned to the same assignee as the present Application.

FIELD OF THE INVENTION

This invention relates to the fields of drilling and producing hydrocarbon wells, and to the measuring of downhole formation characteristics, and to bidirectional communication of measurement and control information between dowhhole and surface equipment.

BACKGROUND OF THE INVENTION

The advent of measurement while drilling (MWD) and logging while drilling (LWD), as well as development of surface control of special drilling processes, such as directional drilling, have been important advances in the art of drilling and producing hydrocarbon wells. These processes require communication, in both directions, between the surface and the downhole measuring and drilling equipment. At present, mud pulse telemetry is the only technique in widespread commercial use for communication while drilling, between downhole equipment and the surface. [Unless otherwise indicated, references, throughout, to "while drilling," or the like, are intended to mean that the drill string is in the borehole or partially in the borehole as part of an overall drilling operation including drilling, pausing, and or tripping, and not necessarily that a drill bit is rotating.] In mud pulse telemetry, data is transmitted as pressure pulses in the drilling fluid. However, mud pulse telemetry has well known limitations, including relatively slow communication, low data rates, and marginal reliability. Current mud pulse technology is capable of sending MWD/LWD data at only about 12 bits per second. In many cases, this rate is insufficient to send all the data that is gathered by an LWD tool string, or is limiting on the configuration of a desired tool string. Also, mud pulse technology does not work well in extended reach boreholes. Signaling from uphole to downhole, by regulating mud pump flow, in order to control processes such as directional drilling and tool functions, is also slow, and has a very low information rate. Also, under certain circumstances, for example underbalanced drilling employing gases or foamed drilling fluid, current mud pulse telemetry cannot function.

There have been various attempts over the years to develop alternatives to mud pulse telemetry that are faster, have higher data rates, and do not require the presence of a particular type of drilling fluid. For example, acoustic telemetry has been proposed, which transmits acoustic waves through the drill string. Data rates are estimated to be about an order of magnitude higher than mud pulse telemetry, but still limiting, and noise is a problem. Acoustic telemetry has not yet become commercially available. Another example is electromagnetic telemetry through the earth. This technique is considered to have limited range, depends on characteristics, especially resistivity, of the formations surrounding the borehole, and also has limited data rates.

The placement of wires in drill pipes for carrying signals has long been proposed. Some early approaches to a wired drill string are disclosed in: U.S. Pat. Nos. 4,126,848, 3,957,118 and 3,807,502, and the publication "Four Different Systems Used for MWD," W. J. McDonald, The Oil and Gas Journal, pages 115-124, Apr. 3, 1978.

The idea of using inductive couplers, such as at the pipe joints, has also been proposed. The following disclose use of inductive couplers in a drill string: U.S. Pat. No. 4,605,268, Russian Federation published patent application 2140527, filed Dec. 18, 1997, Russian Federation published patent application 2040691, filed Feb. 14, 1992, and WO Publication 90/14497A2, Also see: U.S. Pat. Nos. 5,052,941, 4,806,928, 4,901,069, 5,531,592, 5,278,550, and 5,971,072.

The U.S. Pat. No. 6,641,434 describes a wired drill pipe joint that was a significant advance in the wired drill pipe art for reliably transmitting measurement data in high-data rates, bidirectionally, between a surface station and locations in the borehole. The '434 Patent discloses a low-loss wired pipe joint in which conductive layers reduce signal energy losses over the length of the drill string by reducing resistive losses and flux losses at each inductive coupler. The wired pipe joint is robust in that it remains operational in the presence of gaps in the conductive layer. The performance attendant these and other advances in the drill string telemetry art provides opportunity for innovation where prior shortcomings of range, speed, and data rate have previously been limiting on system performance.

It is among the objects of the present invention to provide improved measurement and formation logging operations, as well as improved control and optimization of drilling parameters, that have heretofore been unattainable for various reasons, using synergistic combinations with advanced bidirectional drill string telemetry.

SUMMARY OF THE INVENTION

The present invention has features which, inter alia, take full advantage of recent advances in drill string telemetry. Substantially real time bidirectional communication is used to advantage, in embodiments hereof, to improve measurement and control, during the drilling (and pausing and tripping) processes, to achieve improved operation and decision making.

A form of the invention has application for use in conjunction with an operation of drilling an earth borehole using: a drilling rig, a drill string having its generally upper end mechanically coupleable with and suspendable from the drilling rig, and a bottom hole assembly adjacent the lower end the drill string, the bottom hole assembly including a drill bit at its lower end. A method is set forth for obtaining information about at least one parameter sensed at the bottom hole assembly, including the following steps: providing at least one measuring device in the bottom hole assembly, said at least one measuring device producing measurement data representative of a measured condition at the bottom hole assembly; providing an uphole processor system at the earth's surface; providing a drill string telemetry system coupled with said at least one measuring device and coupled with the uphole processor system; and transmitting said data from the measuring device to the uphole processor system via the drill string telemetry system. (As used herein, references to the earth's surface are intended to encompass locations at or near the surface of any of land, water, or ice, for onshore or offshore drilling.)

In an embodiment hereof, the measured condition at the bottom hole assembly is a measured characteristic of earth formations surrounding the bottom hole assembly, and the step of providing at least one measuring device in the bottom hole assembly comprises providing a logging while drilling device in the bottom hole assembly. In this embodiment, the step of providing a logging while drilling device comprises providing a device selected from the group consisting of a resistivity measuring device, a directional resistivity measuring device, a sonic measuring device, a nuclear measuring device, a nuclear magnetic resonance measuring device, a pressure measuring device, a seismic measuring device, an imaging device, and a formation sampling device.

In another embodiment hereof, the measured condition at the bottom hole assembly is a measured drilling characteristic, and the step of providing at least one measuring device in the bottom hole assembly comprises providing a measuring while drilling device in the bottom hole assembly. In this embodiment, the step of providing a measuring while drilling device comprises providing a device selected from the group consisting of a weight-on-bit measuring device, a torque measuring device, a vibration measuring device, a shock measuring device, a stick slip measuring device, a direction measuring device, and an inclination measuring device.

In another embodiment hereof, the bottom hole assembly includes a directional drilling subsystem, and the step of producing control signals, at the surface processor, comprises producing steering control signals. In a form of this embodiment, the directional drilling subsystem comprises a rotary steerable system, and the step of producing control signals at the surface processor comprises producing steering control signals for the rotary steerable system.

In a form of the invention, the step of providing at least one measuring device in the bottom hole assembly comprises providing a plurality of measuring devices in the bottom hole assembly, the plurality of measuring devices producing measurement data representative of a plurality of conditions at the bottom hole assembly.

In a form of the invention, the drill string telemetry system is bidirectional and includes wired drill pipes in at least a portion of the drill string. In an embodiment of this form of the invention, a wireless coupling is provided between the drill string telemetry system and the uphole processor. The uphole processor system can be located in the general vicinity of the drilling rig, or can be at a location remote from said drilling rig. The drill sting telemetry system can be a hybrid telemetry system including a plurality of different types of telemetry media. In a disclosed embodiment, the hybrid drill string telemetry system includes a section of wired drill pipes, and at least one section of telemetry media selected from the group consisting of electrical cable media, optical cable media, and wireless transmission media. In this embodiment, the section of wired drill pipe includes connected drill pipes, each drill pipe comprising a pin end having an inductive coupler with a conductive ring, a box end having an inductive coupler with a conductive ring, and at least one conductor coupled between said pin and box end inductive couplers, whereby adjacent drill pipes are inductively coupled at their connected pin-to-box ends. For relatively longer runs, repeater subsystems can be provided at joints between drill pipes. In a form of the invention, though, a section of the described wired drill pipe can be provided at a length greater than about 2000 ft. of said connected drill pipes, without any repeaters.

In an embodiment of the invention using the described type of wired drill pipe section, the step of transmitting the data comprises transmitting said data on a carrier having a frequency of less than about 500 KHz. In this embodiment, the data is transmitted at a rate of at least 100 bits per second, and bidirectional transmission is implemented in substantially real time.

In a form of the invention, control signals are produced at the uphole processor and transmitted to the bottom hole assembly via the drill string telemetry system. In an embodiment of this form of the invention, the bottom hole assembly includes a directional drilling subsystem, and the control signals are steering control signals. In this embodiment, the control signals are produced in response to measurement data.

Further features and advantages of the invention will become more readily apparent from the following detailed description when taken in conjunction with the accompanying drawings.

DETAILED DESCRIPTION

Figure 1:
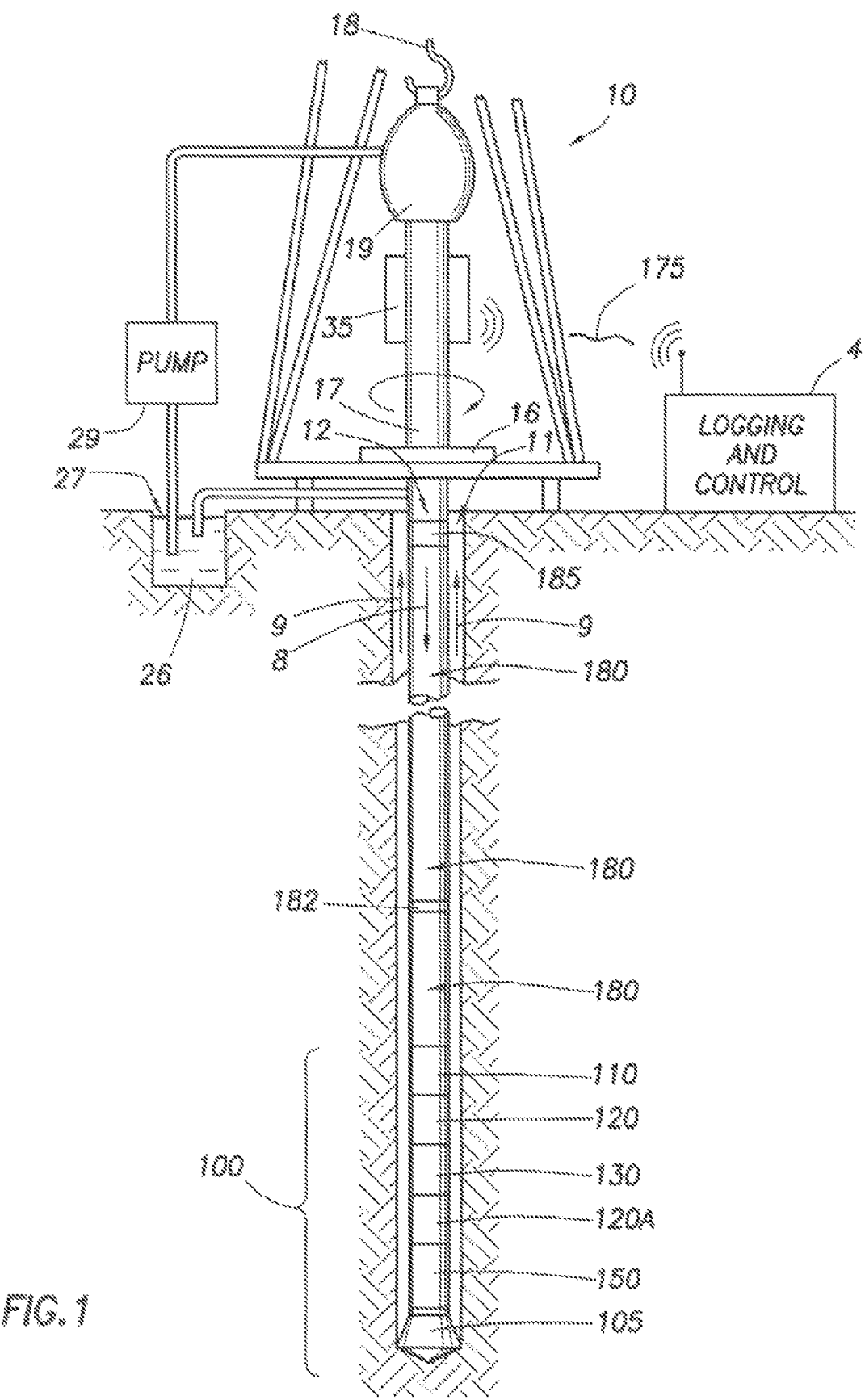
FIG. 1 is a diagram, partially in schematic form and partially in block form, of a system in accordance with embodiments of the invention and which can be used in practicing embodiments of the method of the invention.

FIG. 1 illustrates a wellsite system in which the present invention can be employed. The wellsite can be onshore or offshore. In this exemplary system, a borehole 11 is formed in subsurface formations 30 by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 15 and carries formation cuttings up to the surface as it is returned to the pit 27 for recirculation.

As is known in the art, sensors may be provided about the wellsite to collect data, preferably in real time, concerning the operation of the wellsite, as well as conditions at the wellsite. For example, such surface sensors may be provided to measure parameters such as standpipe pressure, hookload, depth, surface torque, rotary rpm, among others.

The bottom hole assembly 100 of the illustrated embodiment includes an interface sub 110, a logging-while-drilling (LWD) module 120, a measuring-while-drilling (MWD) module 130, a roto-steerable system and motor 150 for directional drilling, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes one or more of the following types of logging devices that measure formation characteristics: a resistivity measuring device, a directional resistivity measuring device, a sonic measuring device, a nuclear measuring device, a nuclear magnetic resonance measuring device, a pressure measuring device, a seismic measuring device, an imaging device, and a formation sampling device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

In the present invention, a drill string telemetry system is employed which, in the illustrated embodiment, comprises a system of inductively coupled wired drill pipes 180 that extend from a surface sub 185 to an interface sub 110 in the bottom hole assembly. Depending on factors including the length of the drill string, relay subs or repeaters can be provided at intervals in the string of wired drill pipes, an example being represented at 182. The relay subs, which can also be provided with sensors, are further described in the '027 Application, assigned to the same assignee as the present Application.

The interface sub 110 provides an interface between the communications circuitry of the LWD and MWD modules and the drill string telemetry system which, in this embodiment, comprises wired drill pipes with inductive couplers. The interface sub 110, which can also be provided with sensors, is described further in the '027 Application assigned to the same assignee as the present Application.

At the top of the wired drill string, is surface sub or surface interface 185. When a wired drill pipe system is used, it is necessary to have a communication link between the topmost wired drill pipe and a surface processor (which, inter alia, typically performs one or more of the following functions: receiving and/or sending data, logging information, and/or control information to and/or from downhole and surface equipment, performing computations and analyses, and communicating with operators and with remote locations). Various approaches have been suggested, some of which are summarized in U.S. Pat. No. 7,040,415, including use of a slip ring device, and use of rotary electric couplings based on induction or so-called transformer action. These techniques are collectively referred to as rotating swivel techniques. A slip ring (also known as brush contact surfaces) is a well known electrical connector designed to carry current or signals from a stationary wire into a rotating device. Typically, it is comprised of a stationary graphite or metal contact (a brush) carried in a non-rotating component which rubs on the outside diameter of a rotating metal ring (e.g., carried on the upper portion of a kelly joint). As the metal ring turns, the electrical current or signal is conducted through the stationary brush to the metal ring making the connection. Rotary electrical couplings based on induction (transformer action), known, as rotary transformers, have provided an alternative to slip rings and contact brushes based upon conduction between rotating and stationary circuitry, so no direct contact is necessary. The transformer windings comprise a stationary coil and a rotating coil, both concentric with the axis of rotation. Either coil can serve as the primary winding with the other serving as the secondary winding. The types of approaches described in this paragraph could be used as the surface sub 185 of FIG. 1. At present, a wireless approach is more preferred, for example of the type described further in the '847 Application and assigned to the same assignee as the present Application. As described in an embodiment of the '847 Application, an uphole interface, in the form of surface sub 185, is coupled with electronics 35 that rotate with kelly 17 and include a transceiver and antenna that communicate bidirectionally with antenna and transceiver of logging and control unit 4 which, in the present embodiment, comprises the uphole processor system. A communication link 175 is schematically depicted between the electronics and antenna of the uphole interface and the logging and control unit 4. Accordingly, the configuration of this embodiment provides a communication link from the logging and control unit 4 through communication link 175, to surface sub 185, through the wired drill pipe telemetry system, to downhole interface 110 and the components of the bottom hole assembly and, also, the reverse thereof, for bidirectional operation.

Figure 2B:
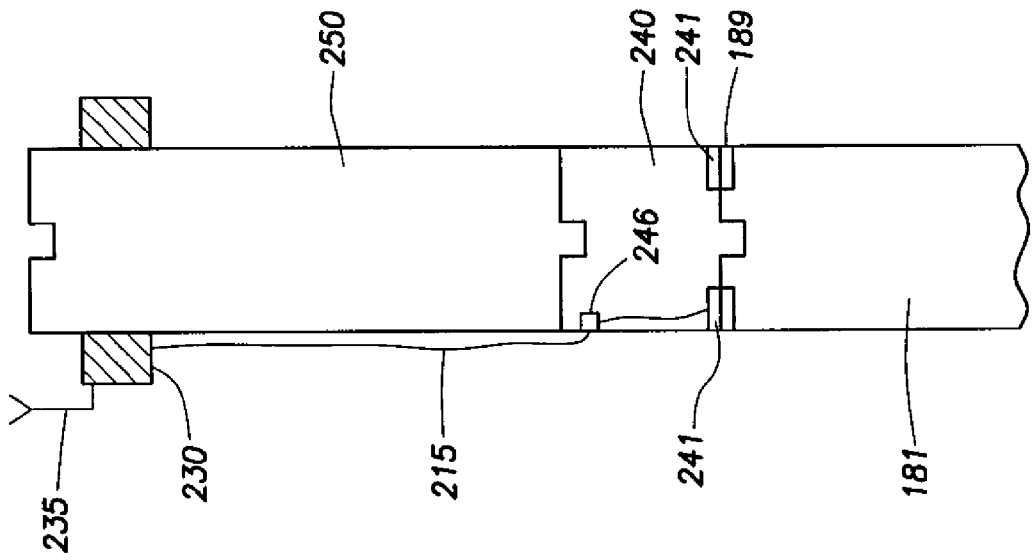
FIG. 2B is a diagram, partially in cross section and partially in block form, of a surface interface utilizing a wireless transceiver, with its electronics and antenna mounted on the drill string.
Figure 2A:
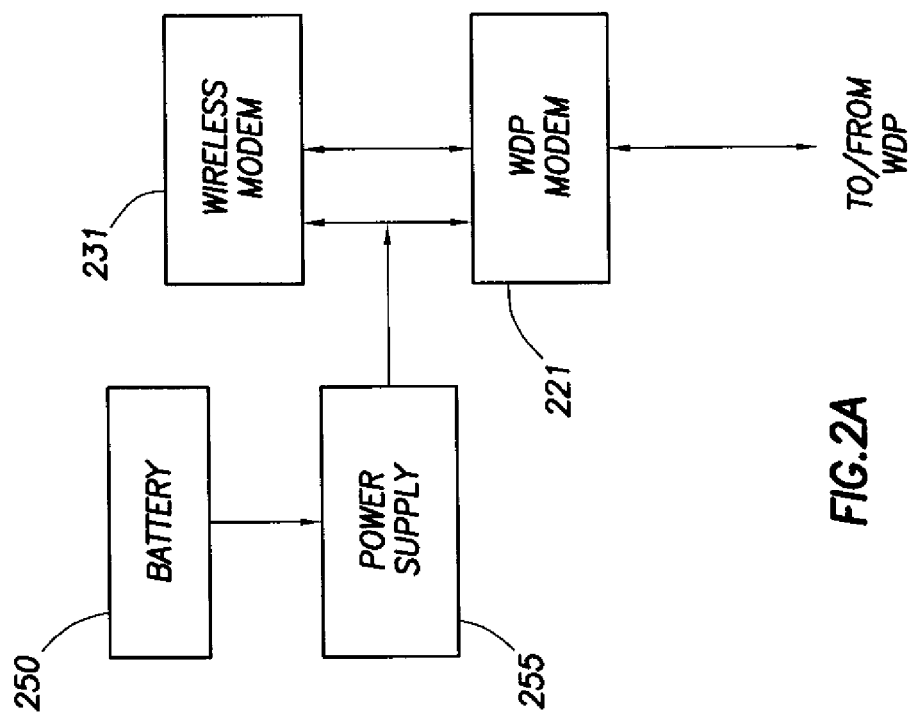
FIG. 2A is a block diagram of a type of wireless transceiver subsystem electronics that can be used in conjunction with an embodiment of the invention.

FIG. 2A shows a block diagram of a type of wireless transceiver subsystem electronics that can be used for the electronics 30 of FIG. 1. Reference can also be made to U.S. Pat. No. 7,040,415. A signal from/to the inductive coupler of the top joint of topmost wired drill pipe is coupled with a WDP modem. The WDP modem 221 is, in turn, coupled with wireless modem 231. A battery 250 and power supply 255 are also provided to power the modems. Other power generating means, which may be more preferred, are described in the '847 Application.

The WDP surface modem 202 is adapted to communicate with one or more modems, repeaters, or other interfaces in the downhole tool via the wired drill pipe telemetry system. Preferably, the modems provide two way communications. The modem communicates with another modem or repeater or other sub located in the downhole tool. Any kind of digital and analog modulation scheme may be used, such as biphase, frequency shift keying (FSK), quadrature phase shift-keying (QPSK), Quadrature Amplitude Modulation (QAM), discrete multi tone (DMT), etc. These schemes may be used in combination with any kind of data multiplexing technologies such as Time Division Multiplexing (TDM), Frequency Division Multiplexing (FDM), etc. The modem may include functionality for drill pipe diagnostics and downhole tool diagnostics.

FIG. 2B shows an embodiment, as described in the '847 Application, in which a special saver sub 240 is provided between the kelly 250 and the topmost wired drill pipe 181. The saver sub 240 has an inductive coupler 241 at its lower end that electrically couples with the inductive coupler of the topmost wired drill pipe. A cable 215, which is connected to inductive coupler 241, exits saver sub 240 through a sealed port, and runs externally of kelly 250 to the transceiver subsystem 230, which includes antenna(s) 235. At the exit position of the cable on the saver sub 240, a connector 246 can be provided. The cable running along the outside of kelly 250 can be sealed in a groove in the kelly and, for example, be protected by an epoxy or PEEK material. A further connector can be provided at the transceiver subsystem electronics. The cable 215 is provided with at least a wire pair. Reference can be made to the '847 Application for further embodiments and transceiver subsystem configurations, and also for description of redundant plural antennas in conjunction with the transceiver subsystems, and for description of safe power generating for use by the rotating transceiver subsystem.

As described in the '027 Application, while only one surface unit 4 at one wellsite is shown, one or more surface units across one or more wellsites may be provided. The surface units may be linked to one or more surface interface using a wired or wireless connection via one or more communication lines. The communication topology between the surface interface and the surface system can be point-to-point, point-to-multipoint or multipoint-to-point. The wired connection includes the use of any type of cables (wires using any type of protocols (serial, Ethernet, etc.) and optical fibers. The wireless technology can be any kind of standard wireless communication technology, such as IEEE 802.11 specification, Bluetooth, zigbee or any non-standard RF or optical communication technology using any kind of modulation scheme, such as FM, AM, PM, FSK, QAM, DMT, OFDM, etc. in combination with any kind of data multiplexing technologies such as TDMA, FDMA, CDMA, etc. As one example, the antenna for the wireless connection can be put in the outer layer of the sub.

One or more sensors (not shown) may be provided in the interface to measure various wellbore parameters, such as temperature, pressure (standpipe, mud, etc.), mud flow, noise, vibration, drilling mechanics (i.e. torque, weight, acceleration, pipe rotation, etc), etc. The sensors may also be linked to analog front end for signal conditioning and/or to a processor for processing and/or analyzing data. The sensors may also be used to perform diagnostics. The diagnostics can be used to locate faults in the wired drill pipe system, measure noise and/or characteristics of the wired drill pipe telemetry system and perform other diagnostics of the wellsite. Different types of sensors may be integrated into the sub. One type of sensor may be a surface sensor for measuring drilling mechanics capable of performing at high sampling rates. Sensor data may be recorded in a memory device.

Figure 3:
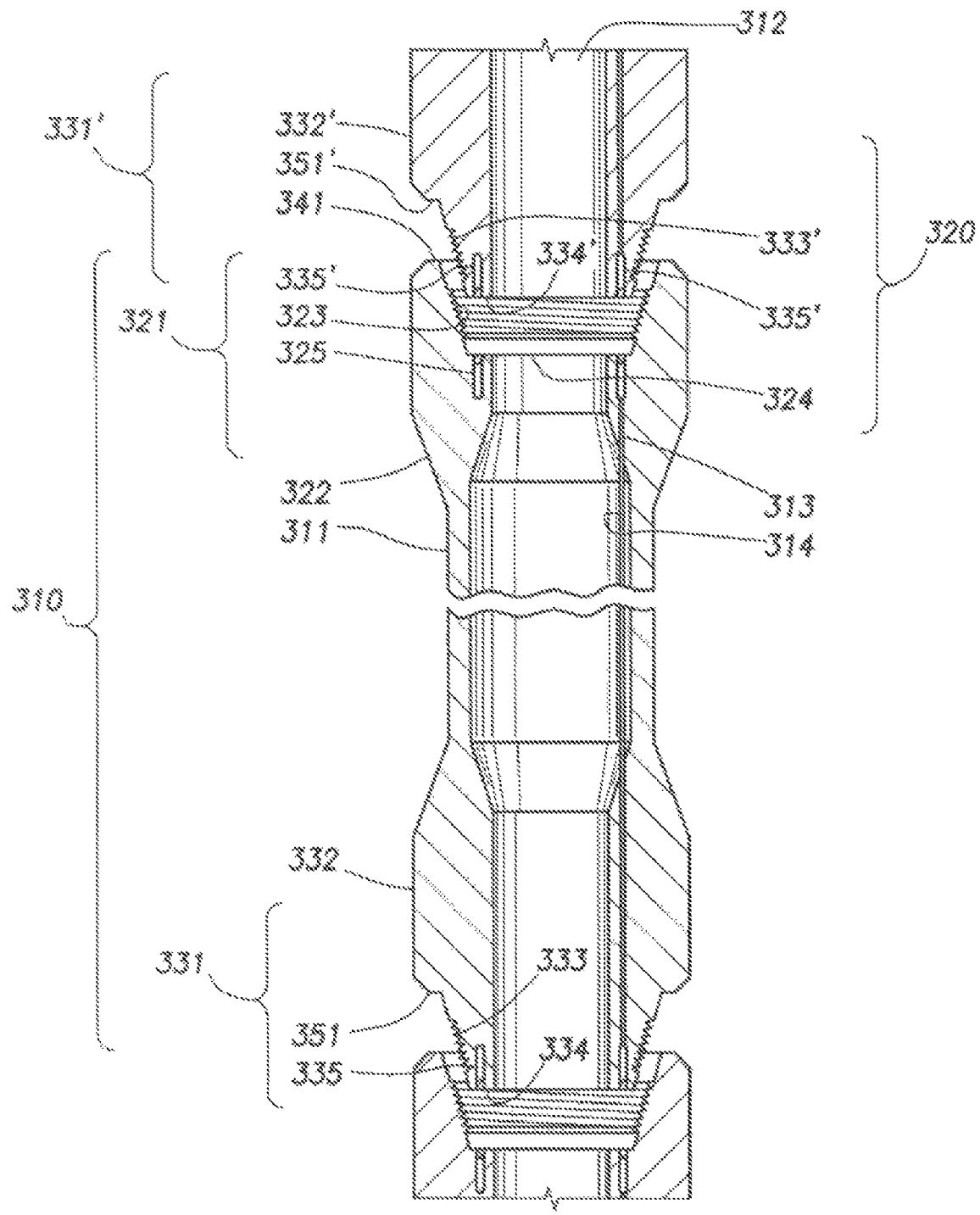
FIG. 3 is a cross-sectional diagram of inductively coupled wired drill pipes and disclosed in U.S. Pat. No. 6,641,434, which can be used as at least part of the drill string telemetry system that is employed in embodiments of the present invention.
Figure 4:
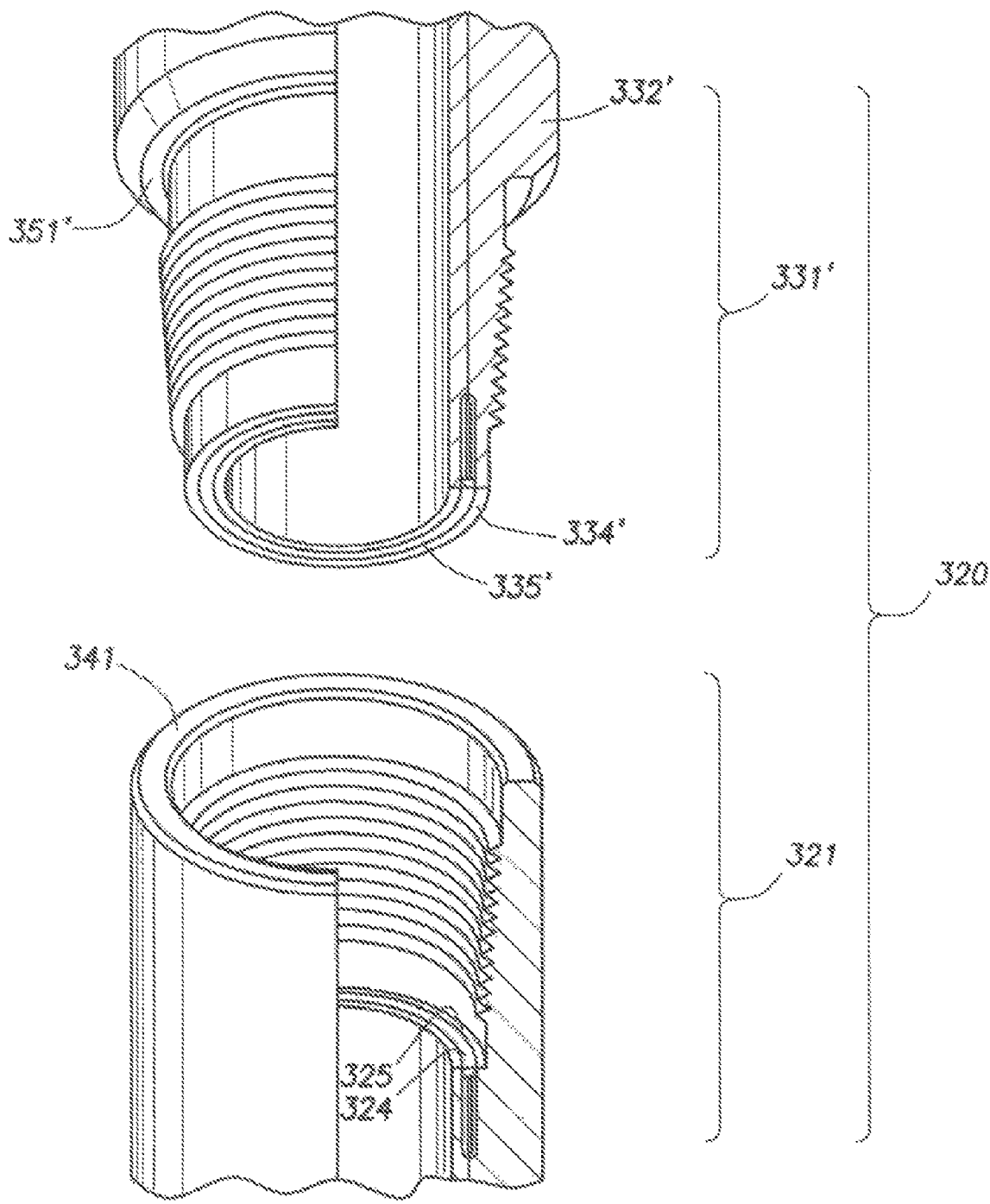
FIG. 4 is a partially cut-away perspective view of a facing pair of current-loop inductive coupler elements of FIG. 3.

FIG. 3-5 show wired drill pipes as disclosed in U.S. Pat. No. 6,641,434, incorporated by reference. A wired pipe joint 310 (FIG. 3) has a first current loop inductive coupler element 321, and a second current-loop inductive coupler element 331, one at each end of the pipe. FIG. 3 also shows wired pipe joint 310 as including an elongated tubular shank 311 with an axial bore 312, a first inductive coupler element 321 a box-end 322, and a second inductive coupler element 331 at pin-end 332. Inductive coupler 320 is shown as constituted by first inductive coupler element 321 and second inductive coupler element 331' of pin-end 332' in an adjacent wired drill pipe.

FIGS. 3 and 4 show box-end 322 defining internal thread 323, and annular inner contacting shoulder 324 with a first slot 325. FIGS. 3 and 4 also show pin-end 332' of an adjacent wired pipe joint defining external thread 333', and annular inner contacting pipe end 334' with a second slot 335'. (An item number followed by a prime indicates an item belonging to an adjacent wired pipe joint).

Figure 5A:
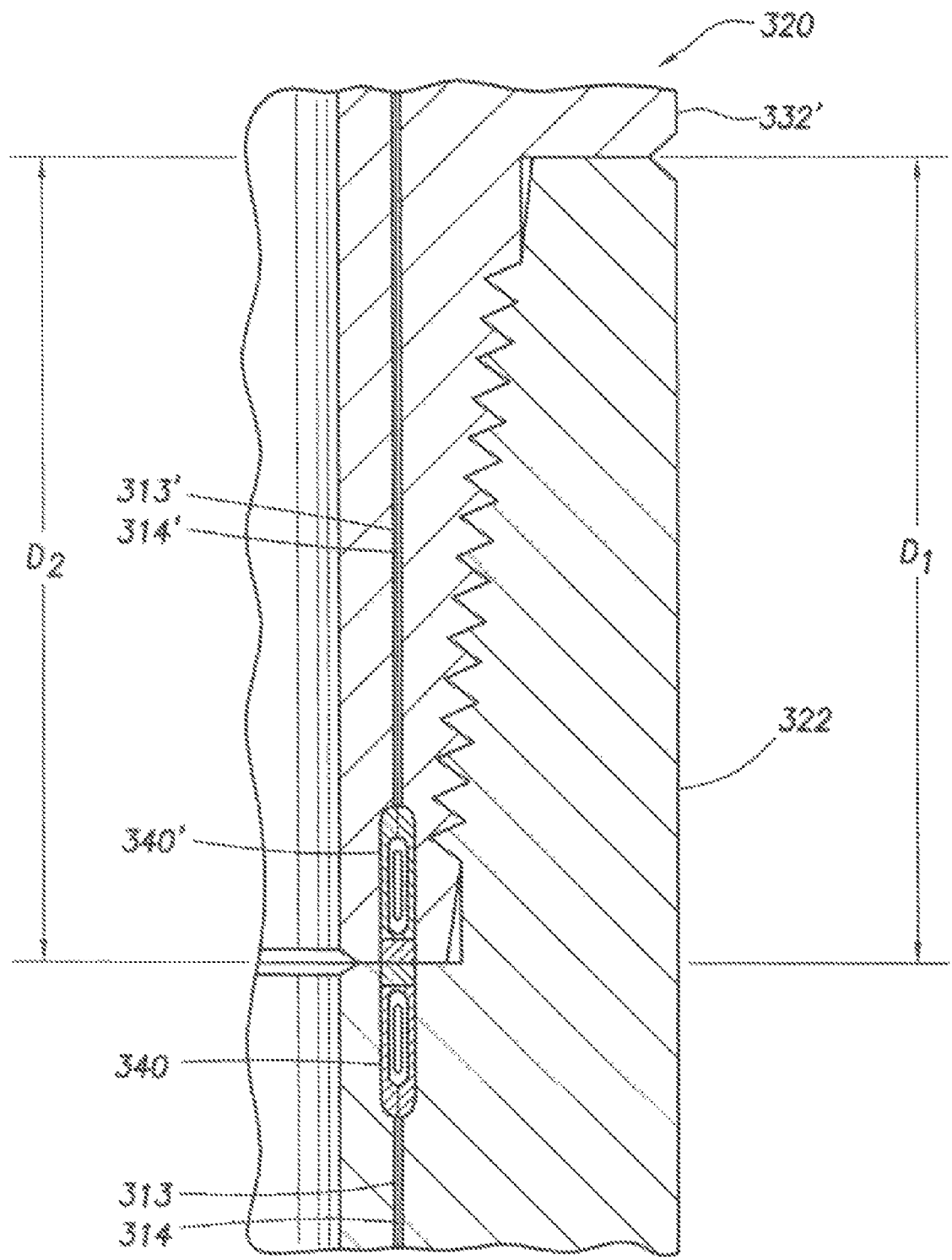
FIG. 5A is a cross-sectional view of the facing pair of current-loop inductive coupler elements of FIG. 4 locked together as part of an operational pipe string, including a cross-sectional view of a closed high-conductivity, low-permeability toroidal path enclosing both cores.

FIG. 5A is a cross section view of the facing pair of current-loop inductive coupler elements of FIG. 3 locked together as part of an operational pipe string. It provides a cross section view of the closed high-conductivity, low-permeability toroidal path 340 enclosing both cores, and a cross section view of conduit 313 forms a passage for internal electrical cable 314 that electrically connects the two inductive coupler elements of wired pipe joint 310.

Figure 5B:
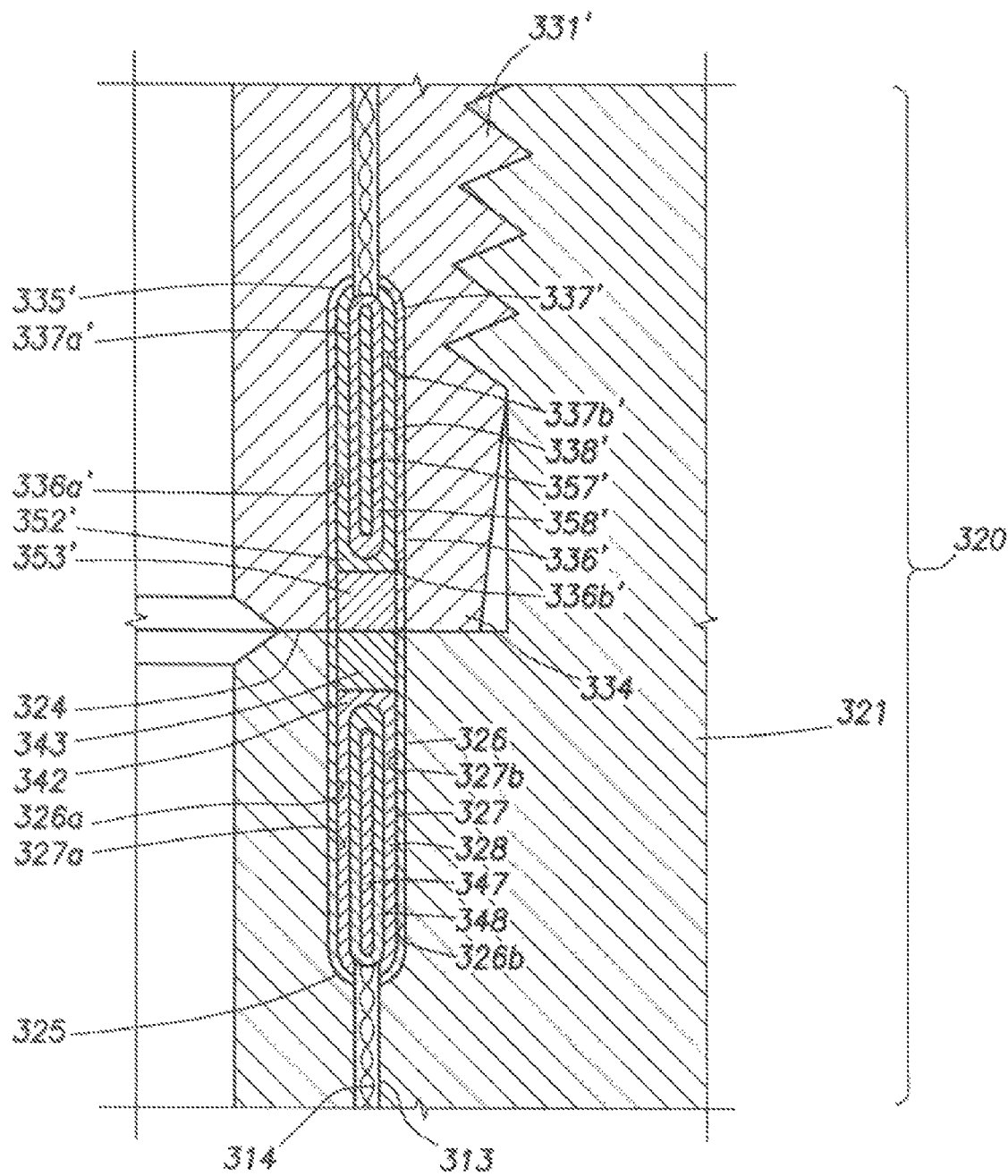
FIG. 5B is an enlarged cross-sectional view showing more detail of the mounting of the electromagnetic components of the current-loop inductive coupler elements of FIG. 5A.

FIG. 5B is an enlarged cross section view showing the mounting of first coil 348, first high-permeability core 347 and first coil winding 348. FIG. 5B also shows conduit 313 enclosing internal electrical cable 314. (For clarity of illustration in FIGS. 5B and 5C, first coil 328 is shown larger, as compared to pin dimensions, than it would be in a preferred embodiment, where drill pipe strength may not be compromised).

FIG. 5B further shows first slot 325 defining a first annular concave surface 326 with concentric facing portions 326a and 326b. First annular concave surface 326 has a first annular concave high-conductivity, low-permeability layer 327 thereon. Layer 327 defines a first annular cavity. Box-end 322 includes first coil 328 fixedly mounted in the first annular cavity between concentric facing portions 327a and 327b of first layer 327.

FIG. 5B further shows second slot 335' defining a second annular concave surface 36 with concentric facing portions 336a'and 336b'. Second annular concave surface 336' has a second annular concave high-conductivity, low-permeability layer 337' thereon. Layer 337' defines a second annular cavity. Pin-end 332' includes a second coil 338' fixedly mounted in the second annular cavity between concentric facing portions 337a' and 37b' of second layer 337'.

FIG. 5B also shows first current-loop inductive coupler element 321 including first high-conductivity, low-permeability layer 327, and second current-loop inductive coupler element 331' including second high-conductivity, low-permeability layer 337'. Each layer is coated onto or attached to the inner surface of its slot. First coil 328 is located between concentric facing portions 327a and 327b of first layer 327. Thus, the first high-conductivity, low-permeability shaped layer (or belt) 327 partially encloses first coil 328. Likewise, second high-conductivity, low-permeability layer (or belt) 337' partially encloses second coil 338'.

First coil 328 is fixed in place within its slot by potting material 342. First 328 coil is further protected by protective filler material 343, preferably RTV. Similarly, second coil 38' is fixed in place within its slot by potting material 352' and is further protected by protective filler material 353.

Figure 5C:
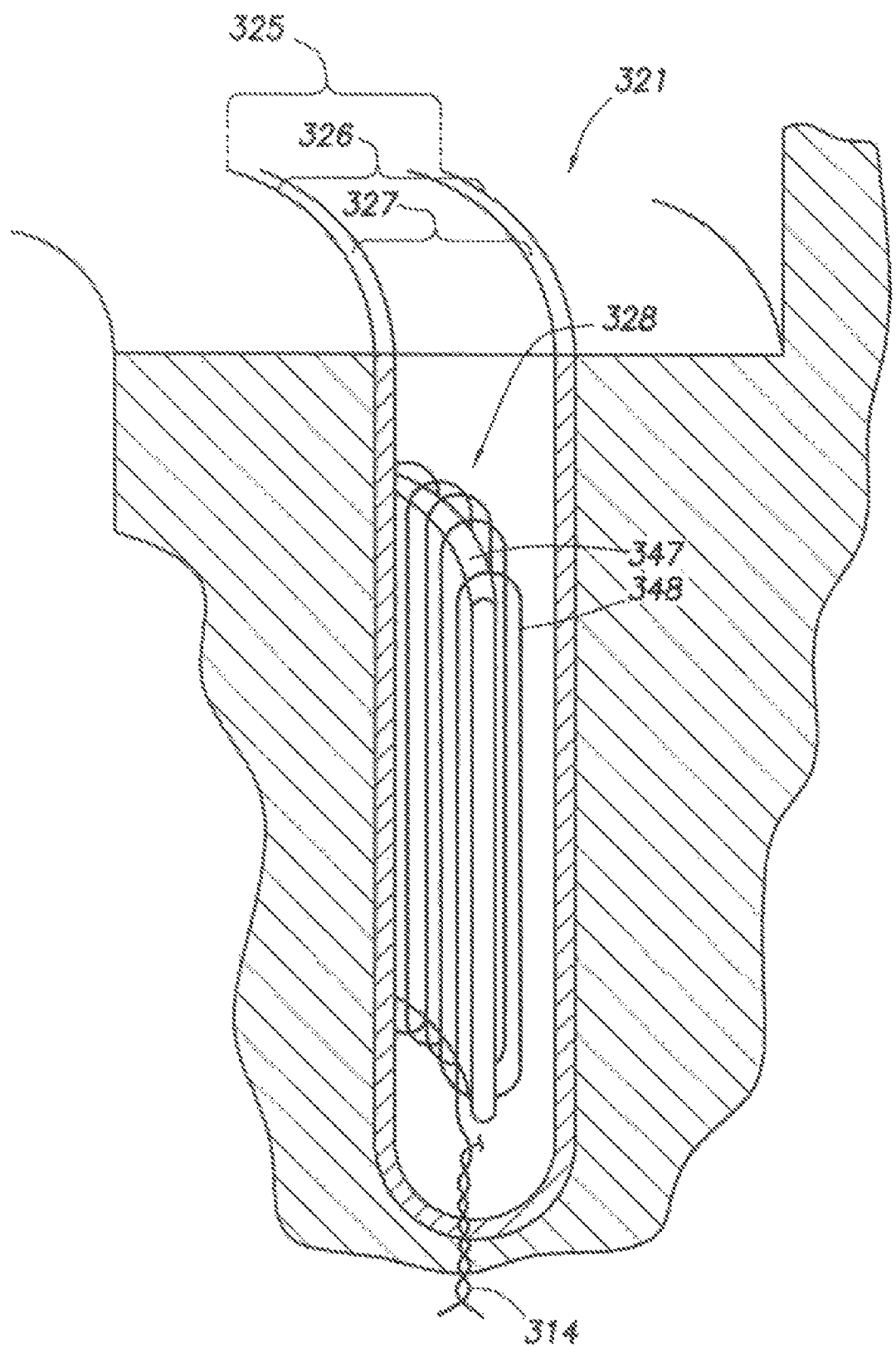
FIG. 5C is a partially cut-away perspective view of the box-end current-loop inductive coupler element of FIG. 5B showing detail of the coil and the internal electrical cable.

FIG. 5C is an enlarged cross section view of the box-end current-loop inductive coupler element of FIG. 5B showing detail of first coil 328, including first high-permeability core 347, and first coil welding 348. Core 347 has an axially elongated cross section. Second coil 338', second core 357' and second coil winding 358' of FIG. 5B are similarly structured.

Coil winding 348 preferably has a large number of turns. In one preferred embodiment, the number is approximately 200. The box-end belt of FIG. 5C is positioned to cooperate with the second high-conductivity, low-permeability pin-end belt of an adjacent second pipe joint to create closed high-conductivity, low-permeability toroidal path 340 as shown in FIG. 5A. When the first and second pipe joints are locked together as part of an operational pipe string, layers 327 and 337' form path 340. This closed path encloses the first coil and the second coil. The low-loss current-loop inductive coupler may be viewed as a pair of transformers connected back to back through path 340.

Each coil induces an electrical current in the pipe joint, primarily along the high-conductivity, low-permeability layer of the pipe joint that overlays the inner surface of the slot. Each layer of conductive materials attached to, or coated onto, the inner surface of the slot surrounding the core.

As described in the '434 Patent, the high-conductivity, low-permeability layer may be made of any high-conductivity, low-permeability material that has a conductivity that is substantially higher than the conductivity of steel, examples being copper and copper alloys, among other metals.

The high-conductivity, low-permeability layer reduces resistive losses over the length of the pipe string by reducing the resistance of toroidal path 340 from what it would be if path 340 passed only through the steel of the pipe joint. The high-conductivity, low-permeability layer also reduces flux losses over the length of the pipe string by reducing magnetic flux penetration into the steel of each wired pipe joint. Although toroidal path 340 is ideally a closed path, it is not essential that path 340 consist entirely of conductive layer because any gap in the conductive layer of a path 340 would be bridged by the steel of the local pipe-end. A gap in the conductive layer of a toroidal path could be produced by wear on a relatively soft conductive layer near the contact point of the hard steel of contacting pipe ends. A few such gaps in the conductive layer of a toroidal path over the length of the pipe string would not introduce sufficient energy losses to have a significant effect.

As in the '434 Patent, the system of FIGS. 3-5D describes a dual-contact pipe joint with first and second inductive coupler elements located at an inner shoulder and an inner pipe end, respectively. The dimensions of the pipe joint are such that the distance between the outer pipe end and the inner shoulder, is greater than the distance between the outer shoulder and the inner pipe end, by a small amount. FIG. 5A shows a distance $D_1$ between outer pipe end 341 and annular inner contacting shoulder 324, and distance $D_2$ between outer shoulder 351' and annular inner contacting pipe end 334'. Distance $D_2$ is greater than distance $D_2$ by a small amount. When two pipe joints are properly tightened (i.e. forced together with the torque needed to achiever proper pipe-sealing of end 341 against shoulder 351' of an adjacent wired pipe), then this small amount allows that same torque to automatically tighten inner shoulder 324 against inner pipe end 334' of an adjacent wired pipe joint so as to reliably form a closed high-conductivity, low-permeability toroidal path 340.

In an embodiment hereof, a section of wired drill pipe, of the type described in the '434 Patent and in FIGS. 3-5C, facilitates a feature of providing a section of connected wired drill pipes, at a length greater than about 1000 ft. and less than about 7000 ft., without any repeaters.

Figure 6:
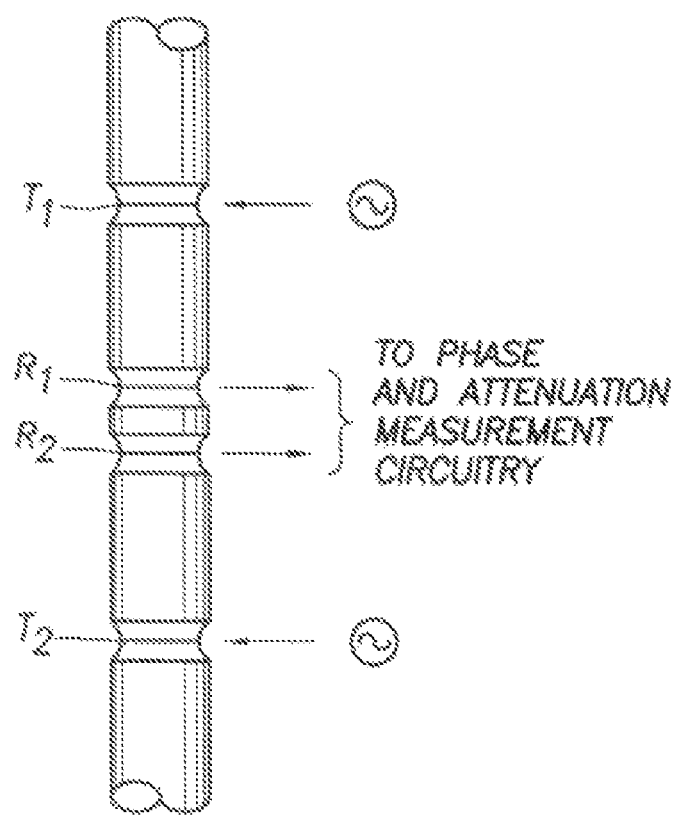
FIG. 6 is a diagram of a formation resistivity logging device of a type that is utilized as a logging while drilling (LWD) device, or part of a suite of LWD devices, in embodiments of the method and system of the invention.

An example of a tool which can be the LWD tool 120, or can be a part of an LWD tool suite 120 of the system and method hereof, is the dual resistivity LWD tool disclosed in U.S. Pat. No. 4,899,112 and entitled "Well Logging Apparatus And Method For Determining Formation Resistivity At A Shallow And A Deep Depth," incorporated herein by reference. As seen in FIG. 6, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. The above-referenced U.S. Pat. No. 4,899,112 can be referred to for further details. In operation, attenuation-representative signals and phase-representative signals are coupled to a processor, an output of which is coupleable to telemetry circuitry which, in the prior art, modulates mud pulses and, in an embodiment of the system hereof, modulates a carrier of the drill string telemetry system. Unlike prior application of the dual resistivity technique in conjunction with mud pulse telemetry, the system and method hereof can provide much more data and provide it in substantially real time.

A particularly advantageous use of the system hereof is in conjunction with controlled steering or "directional drilling." In this embodiment, a roto-steerable subsystem 150 (FIG. 1) is provided, and is adapted for control via the drill string telemetry system. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well. A directional drilling system may also be used in vertical drilling operation as well. Often the drill bit will veer off of an planned drilling trajectory because of the unpredictable nature of the formations being penetrated or the varying forces that the drill bit experiences. When such a deviation occurs, a directional drilling system may be used to put the drill bit back on course. A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems. In the point-the-bit system, the axis of rotation of the drill bit is deviated from the local axis of the bottom hole assembly in the general direction of the new hole. The hole is propagated in accordance with the customary three point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953 all herein incorporated by reference. In a push-the-bit rotary steerable system, the requisite non-collinear condition is achieved by causing either or both of the upper or lower stabilizers or another mechanism to apply an eccentric force or displacement in a direction that is preferentially oriented with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form the drill bit is required to cut side ways in order to generate a curved hole. Examples of push-the-bit type rotary steerable systems, and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; 5,971,085 all herein incorporated by reference.

Figure 7:
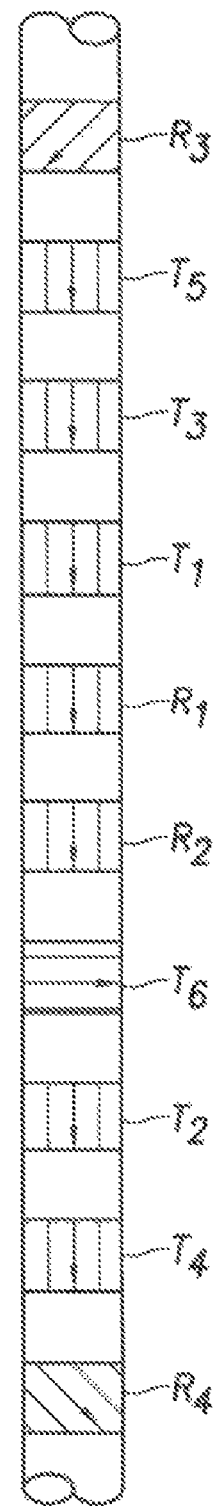
FIG. 7 is a diagram of a directional resistivity device of a type that is utilized as a logging while drilling (LWD) device, or part of a suite of LWD devices, in embodiments of the method and system of the invention.

The steering control, from the surface, can be based, at least in part, on formation resistivity measurements using, for example, the type of resistivity logging device described in conjunction with FIGS. 6 and 7.

It has been pointed out that because conventional LWD tools see only a relatively short distance into the formation, they may be inches from a contact or bed boundary before sensing its presence, thus leaving little time for geosteering adjustments. A shallow depth of investigation can lead to less than optimal, reactive geosteering, where trajectory is changed only when the bit drills out of the top or base of a pay zone. Reactive geosteering can result in lower productive exposure, undulating well paths and difficult completions. (See L. Chou et al., "Steering Toward Enhanced Production," Oilfield Review, 2005, incorporated herein by reference.) The substantially real time bidirectional drill string telemetry hereof can improve geosteering reaction time and accuracy.

The combination of the bidirectional telemetry hereof with a geosteering application is further compelling when employed in conjunction with a directional deep-reading logging-while-drilling drilling tool, as part of the LWD tool or tools 120 in FIG. 1. Signals from tools having axially aligned cylindrically symmetrical coils are not directionally sensitive. The tool of FIG. 7 provides tilted and transverse coils to obtain directionally sensitive measurements. (See, again, L. Chou et al., Oilfield Review, 2005, supra.) The sensor array includes six transmitter antennas and four receiver antennas. Five transmitter antennas ($T_1$ through $T_5$) are arranged axially along the length of the tool. A sixth transmitter antennas ($T_6$) is oriented transverse to the tool axis. A receiver antenna is positioned at each end of the tool. This pair of receiver antennas ($R_3$ and $R_4$) brackets the transmitters, and each of these receivers is tilted 45 degrees to the tool axis. An additional pair of receiver antennas ($R_1$ and $R_2$), located in the center of the transmitter array, is arranged axially and can obtain conventional type propagation resistivity measurements. The described arrangement produces a preferential sensitivity to conductivity on one side of the tool. As the tool rotates, its sensors can detect nearby conductive zones and register the direction from which maximum conductivity can be measured. Magnetometers and accelerometers can provide reference directional orientation data for the tool. In addition to its directional capability, the tool provides relatively deeper measurements than most conventional LWD resistivity tools. The substantially real time bidirectional drill string telemetry hereof, in conjunction with the capabilities of the directional resistivity logging tool, as described, improves performance of geosteering by increasing the amount of data at the surface and the speed and precision of directional drilling control.

Figure 8:
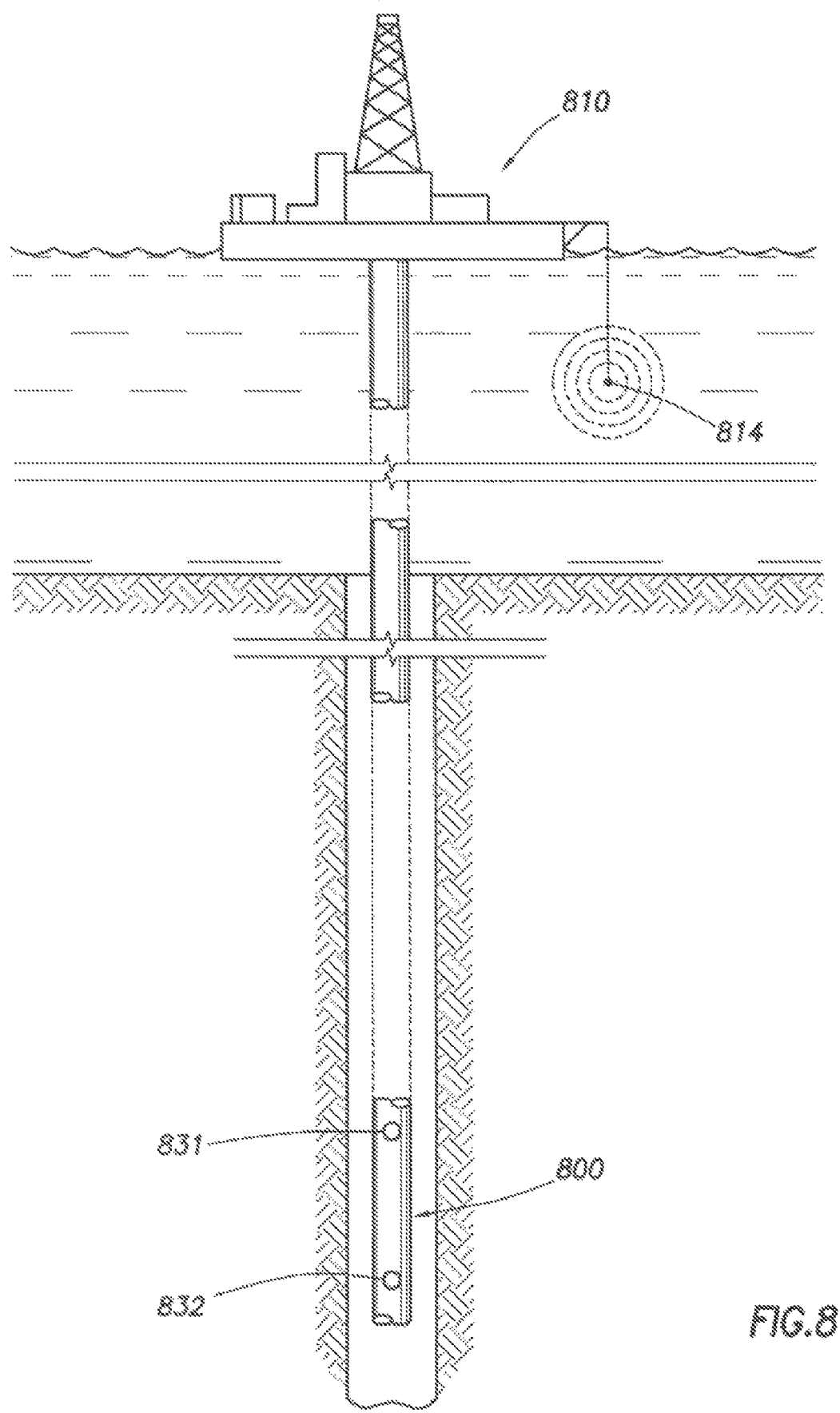
FIG. 8 is a diagram of a sonic logging device of a type that is utilized as a logging while drilling (LWD) device, or part of a suite of LWD devices, in embodiments of the method and system of the invention.

Another example of a tool which can be the LWD tool 120, or can be a part of an LWD tool suite 120, is a sonic logging while drilling tool of the type described in U.S. Pat. No. 6,308,137, incorporated herein by reference. In a disclosed embodiment, as shown in FIG. 8, an offshore rig 810 is employed, and a sonic transmitting source or array 814 is deployed near the surface of the water. Alternatively, any other suitable type of uphole or downhole source or transmitter can be provided. An uphole processor controls the firing of the transmitter 814. The uphole equipment can also include acoustic receivers and a recorder for capturing reference signals near the source. In the prior art, the uphole equipment further includes a mudpulse telemetry equipment for receiving MWD signals from the downhole equipment. The telemetry equipment and the recorder are typically coupled to a processor so that recordings may be synchronized using uphole and downhole clocks. The downhole LWD module 800 includes at least acoustic receivers 831 and 832, which are coupled to a signal processor so that recordings may be made of signals detected by the receivers in synchronization with the firing of the signal source. In the present embodiment, the wired drill pipe, or other high speed drill string telemetry, enables high speed synchronization of downhole and uphole timing signals, control, if desired, from an uphole processor, and high speed transmission of logging data and/or computed parameters to the surface, which is particularly useful when relatively large amounts of data are available from sonic and/or seismic logging.

Figure 9A:
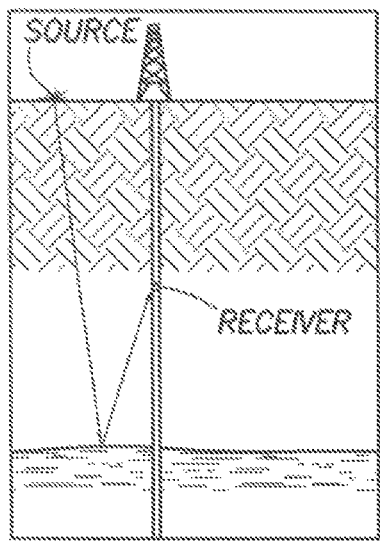
FIGS. 9A-9D are diagrams of seismic logging devise that are utilized as of a type that is utilized as a logging while drilling (LWD) device, or part of a suite of LWD devices, in embodiments of the method and system of the invention.
Figure 9B:
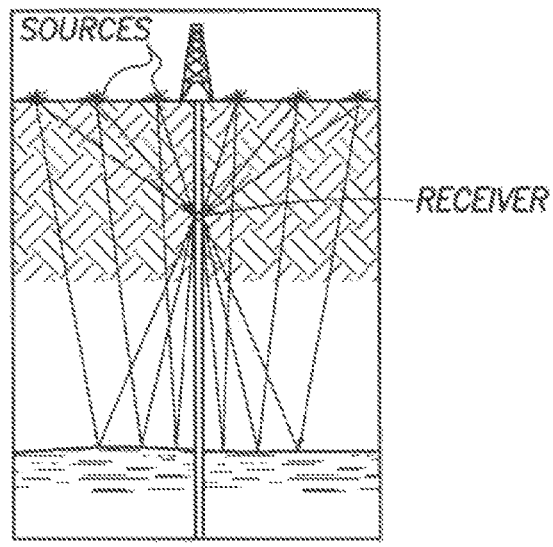
Figure 9C:
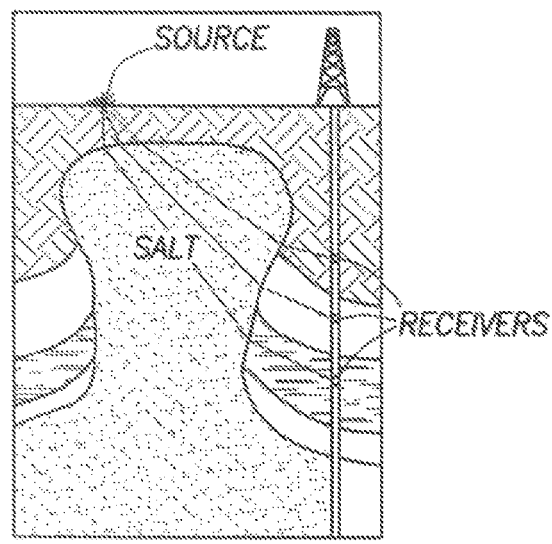
Figure 9D:
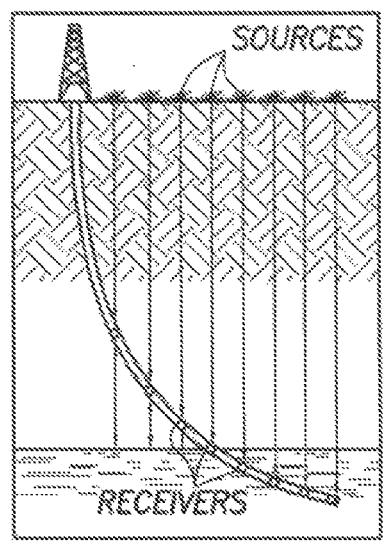

Another example of a tool which can be the LWD tool 120, or can be a part of an LWD tool suite 120, is a tool for obtaining seismic measurements, of the type disclosed in P. Breton et al., "Well Positioned Seismic Measurements," Oilfield Review, pp. 32-45, Spring, 2002, incorporated herein by reference. The downhole LWD tool can have a single receiver (as depicted in FIGS. 9A and 9B), or plural receivers (as depicted in FIGS. 9C and 9D), and can be employed in conjunction with a single seismic source at the surface (as depicted in FIGS. 9A and 9C) or plural seismic sources at the surface (as depicted in FIGS. 9B and 9D). Accordingly, FIG. 9A, which includes reflection off a bed boundary, and is called a "zero-offset" vertical seismic profile arrangement, uses a single source and a single receiver, FIG. 9B, which includes reflections off a bed boundary, and is called a "walk-away" vertical seismic profile arrangement, uses plural sources and a single receiver, FIG. 9C, which includes refraction through salt dome boundaries, and is called a "salt proximity" vertical seismic profile, uses a single source and plural receivers, and FIG. 9D, which includes some reflections off a bed boundary, and is called a "walk above" vertical seismic profile, uses plural sources and plural receivers. As above, the wired drill pipe, or other high speed drill string telemetry, enables high speed synchronization of downhole and uphole timing signals, control, if desired, from an uphole processor, and high speed transmission of logging data and/or computed parameters to the surface, which is particularly useful when relatively large amounts of data are available from sonic and/or seismic logging.

Figure 10:
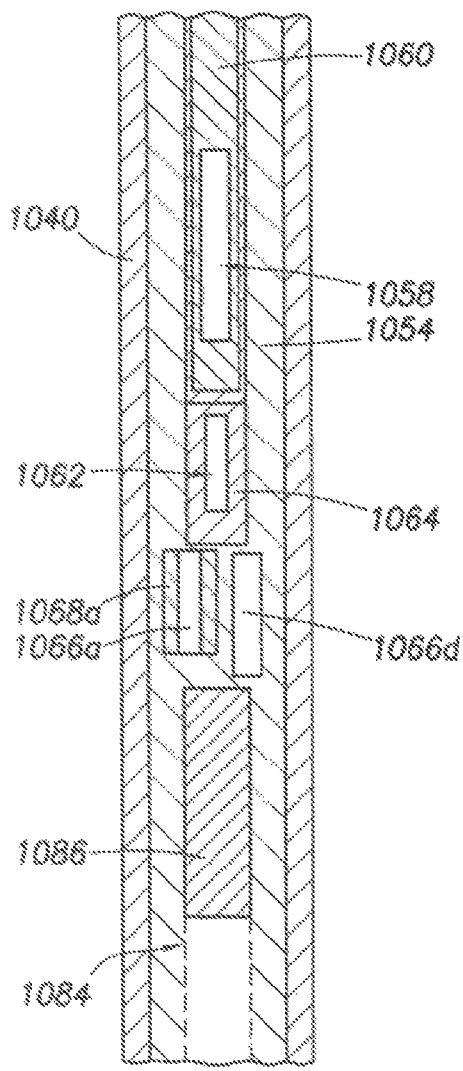
FIG. 10 is a diagram of a nuclear logging device of a type that is utilized as a logging while drilling (LWD) device, or part of a suite of LWD devices, in embodiments of the method and system of the invention.

FIG. 10 shows a logging-while-drilling nuclear device as disclosed in U.S. Pat. Re. 36,012, incorporated herein by reference, which utilizes an accelerator-based source, it being understood that other types of nuclear LWD tools can also be utilized as the LWD tool 120 or part of an LWD tool suite 120. In FIG. 10, a drill collar section 1040 is shown as surrounding a stainless steel tool chassis 1054. Formed in the chassis 1054 to one side of the longitudinal axis thereof (not visible in this view) is a longitudinally extending mud channel for conveying the drilling fluid downward through the drill string. Eccentered to the other side of the chassis 1054 are a neutron accelerator 1058, its associated control and high voltage electronics package 1060 and a coaxially aligned near-spaced detector 1062. The near-spaced detector 1062 is primarily responsive to accelerator output with minimum formation influence. The detector 1062 is surrounded, preferably on all surfaces except that adjacent to the accelerator 1058, by a shield 1064 of combined neutron moderating-neutron absorbing material. The output of the near detector 1062 is used to normalize other detector outputs for source strength fluctuation. Located longitudinally adjacent to the near-spaced detector 1062 is a plurality or array of detectors, of which 1066a and 1066d are shown in this view. The detector 1066a is back-shielded, as shown at 1068a. The array includes at least one, and preferably more than one, epithermal neutron detector and at least one gamma ray detector, represented in this example at 1084, with shield 1086. One or more thermal neutron detectors can also be included. The above-referenced U.S. Pat. Re. 36,012 can be referred to for further details. The detector signals can be utilized to determine, inter alia, formation density, porosity, and lithology. In the present embodiment, signals representative of these measurements are advantageously transmitted at high speed to the earth's surface via the wired drill pipe or other bidirectional drill string telemetry system hereof, and control signals from the surface are also conveyed downhole at high speed, and with accuracy.

Figure 11:
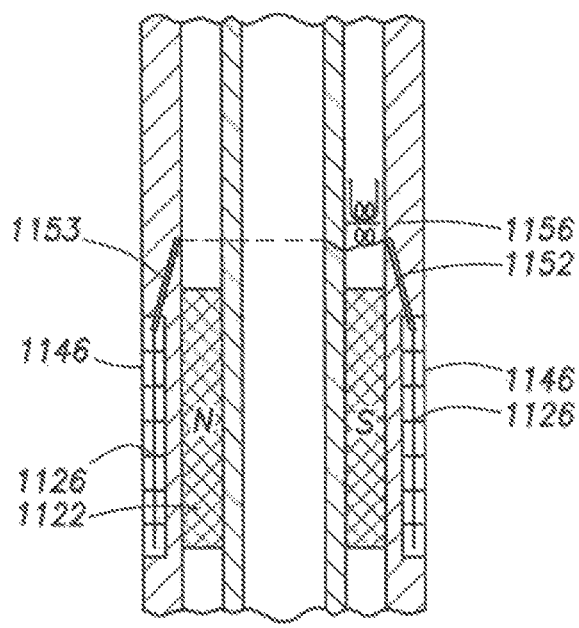
FIG. 11 is a diagram of a nuclear magnetic resonance logging device of a type that is utilized as a logging while drilling (LWD) device, or part of a suite of LWD devices, in embodiments of the method and system of the invention.

FIG. 11 shows an embodiment of a type of device described in U.S. Pat. No. 5,629,623 for formation evaluation while drilling using pulsed nuclear magnetic resonance (NMR), incorporated herein by reference, it being understood that other types of NMR/LWD tools can also be utilized as the LWD tool 120 or part of an LWD tool suite 120. As described in the '623 Patent, an embodiment of one configuration of the device comprises a modified drill collar having an axial groove or slot 1150 that is filled with ceramic insulator, and contains RF antenna 1126, which is protected by a non-magnetic cover 1146, and produces and receives pulsed RF electromagnetic energy. The conductors of the RF antenna are grounded at one end to the drill collar. At the other end, the conductors are coupled to an RF transformer 1156 via pressure feed-throughs 1152 and 1153. The transformer 1156 keeps a 180° phase difference between the currents in diametrically opposite RF conductors. A cylindrical magnet 1122 produces a static magnetic field in the formations. The RF antenna can also be arranged so that the drill collar itself produces the oscillating RF magnetic field. The oscillating RF magnetic field, which excites nuclei of substances in the formations, is axially symmetric, to facilitate measurements during rotation of the drill string. In the present embodiment, signals representative of these measurements are advantageously transmitted at high speed to the earth's surface via the wired drill pipe or other bidirectional drill string telemetry system hereof, and control signals from the surface are also conveyed downhole at high speed, and with accuracy.

Figure 12:
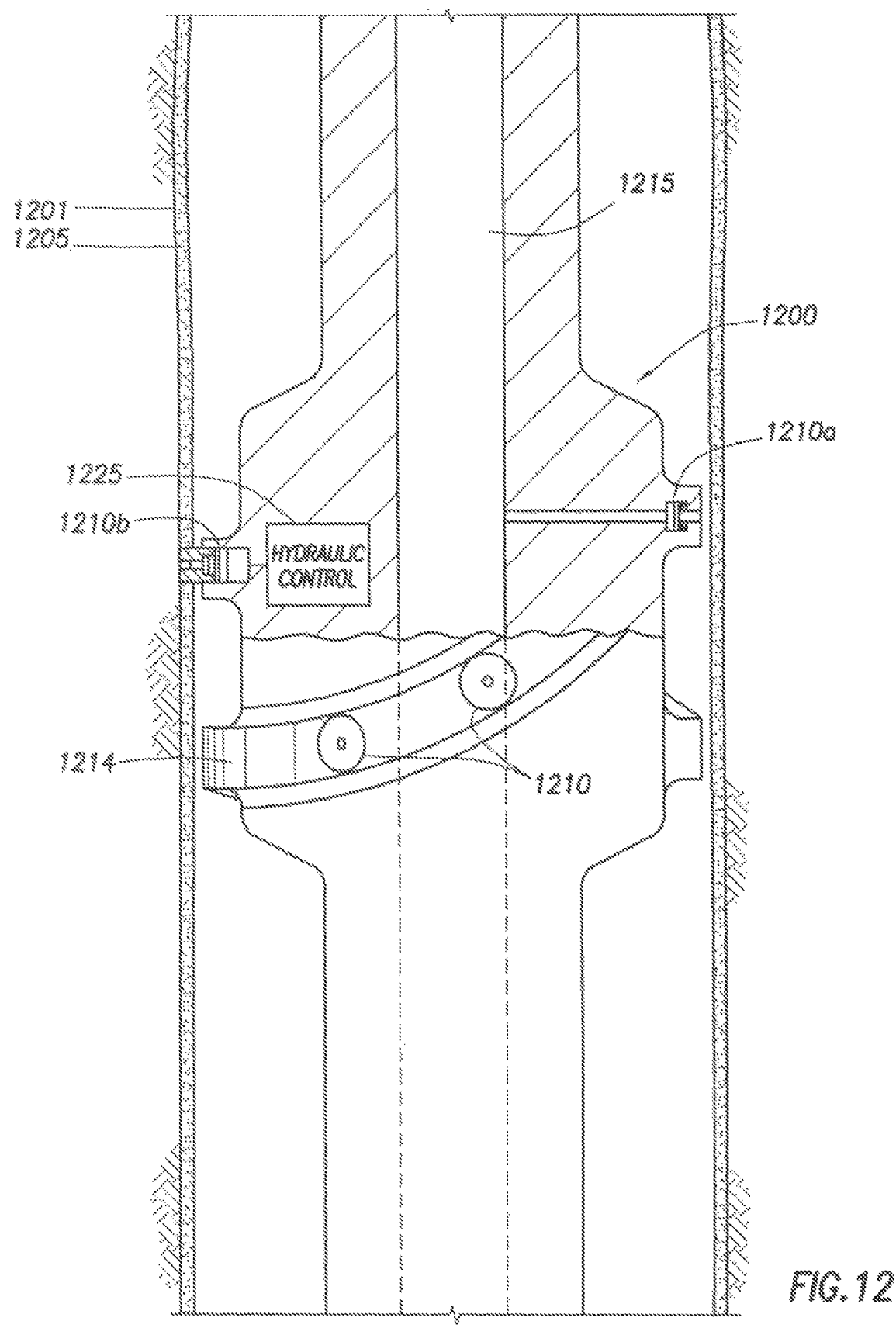
FIG. 12 is a diagram of a pressure measurement logging device of a type that is utilized as a logging while drilling (LWD) device, or part of a suite of LWD devices, in embodiments of the method and system of the invention.

FIG. 12 is a simplified diagram of a logging device, of a type disclosed in U.S. Pat. No. 6,986,282, incorporated herein by reference, for determining downhole pressures including annular pressure, formation pressure, and pore pressure, during a drilling operation, it being understood that other types of pressure measuring LWD tools can also be utilized as the LWD tool 120 or part of an LWD tool suite 120. The device is formed in a modified stabilizer collar 1200 which has a passage 1215 extending therethrough for drilling fluid. The flow of fluid through the tool creates an internal pressure $P_I$. The exterior of the drill collar is exposed to the annular pressure $P_A$ of the surrounding wellbore. The differential pressure $\delta P$ between the internal pressure $P_I$ and the annular pressure $P_A$ is used to activate the pressure assemblies 1210. Two representative pressure measuring assemblies are shown at 1210a and 1210b, respectively mounted on stabilizer blades. Pressure assembly 1210a is used to monitor annular pressure in the borehole and/or pressures of the surrounding formation when positioned in engagement with the wellbore wall. In FIG. 12, pressure assembly 1210a is in non-engagement with the borehole wall 1201 and, therefore, may measure annular pressure, if desired. When moved into engagement with the borehole wall 1201, the pressure assembly 1210a may be used to measure pore pressure of the surrounding formation. As also seen in FIG. 12, pressure assembly 1210b is extendable from the stabilizer blade 1214, using hydraulic control 1225, for sealing engagement with a mudcake 1205 and/or the wall 1201 of the borehole for taking measurements of the surrounding formation. The above referenced U.S. Pat. No. 6,986,282 can be referred to for further details. Circuitry (not shown in this view) couples pressure-representative signals to a processor/controller, an output of which is coupleable to telemetry circuitry which, in the prior art, modulates mud pulses and, in an embodiment of the system hereof, modulates a carrier of the drill string telemetry system. In the present embodiment, signals representative of these measurements are advantageously transmitted at high speed to the earth's surface via the wired drill pipe other bidirectional drill string telemetry system hereof, and control signals from the surface are also conveyed downhole at high speed and with accuracy.

Techniques have recently been disclosed that employ equipment suspended from a wireline for precision lateral drilling of a subsidiary borehole using, locking mechanisms, expanding and contracting mechanisms an electric motor, a lateral drill shaft, a positive displacement pump, and a drill bit. The pump is used to circulate fluid in the lateral borehole to clear drill cuttings. Reference can be made to PCT International Publication No. WO2004/072437, PCT International Publication No. WO2005/071208, PCT International Publication No. WO2006/010877, and U.S. Patent Application Publication No. U.S. 2005/0252688, all herein incorporated by reference. In an embodiment hereof, a precision lateral drilling tool is used on a drill string in conjunction with a drill string telemetry system.

The invention claimed is:

1. A method for obtaining and using measurement information comprising the steps of:
   providing at least one measuring device in a bottom hole assembly, said at least one measuring device producing measurement data representative of a measured condition proximate to the bottom hole assembly;
   providing an uphole processor system at the earth's surface;
   providing a drill string telemetry system comprising at least a portion of wired drill pipe, the wired drill pipe comprising one or more drill pipes having a cable communicatively coupled at each joint of the one or more drill pipes, the drill string telemetry system coupled with said at least one measuring device and coupled with said uphole processor system, wherein said step of providing a drill string telemetry system comprises providing at least one of the string as connected drill pipes, each drill pipe comprising a pin end having an inductive coupler with a conductive ring a box end having an inductive coupler with a conductive ring, and at least one conductor coupled between said pin and box end inductive couplers, whereby adjacent drill pipes are inductively coupled at their connected pin-to-box ends;
   transmitting said measurement data from said measuring device to said uphole processor system via said drill string telemetry system;
   transmitting control signals to the bottom hole assembly based on the measurement data; and
   geosteering the drill string based on the control signals, the step of geosteering including changing a trajectory of the drill string and a planned path of the drill string, wherein the control signals are received by a direction drilling subsystem.

2. The method as defined by claim 1, wherein said measured condition at the bottom hole assembly is a measured characteristic of earth formations surrounding the bottom hole assembly, and wherein said step of providing at least one measuring device in the bottom hole assembly comprises providing a logging while drilling device in the bottom hole assembly.

3. The method as defined by claim 1 wherein said measured condition at the bottom hole assembly is a measured drilling characteristic, and wherein said step of providing at least one measuring device in the bottom hole assembly comprises providing a measuring while drilling device in the bottom hole assembly.

4. The method as defined by claim 1, wherein said step of providing at least one measuring device in the bottom hole assembly comprises providing a plurality of measuring devices in the bottom hole assembly, said plurality of measuring devices producing measurement data representative of a plurality of conditions at the bottom hole assembly.

5. The method as defined by claim 1, wherein the control signals are received by a rotary steerable system.

6. The method as defined by claim 5, wherein said control signals relate to steering of the bottom hole assembly.

7. The method as defined by claim 6, further comprising the step of providing at least one downhole sensor in the wired drill pipe portion of the drill string, said at least one sensor communicating with the uphole processor via wired drill pipes.

8. The method as defined by claim 6, further comprising the step of providing a plurality of distributed downhole sensors at different locations in the wired drill pipe portion of the drill string, said sensors communicating with said uphole processor via said wired drill pipes.

9. The method as defined by claim 6, wherein said step of providing a drill string telemetry system coupled with said at least one measuring device and coupled with said uphole processor comprises providing a wireless coupling between said drill string telemetry system and said uphole processor.

10. The method as defined by claim 1, wherein said step of providing an uphole processor system comprises providing said uphole processor system at a location remote from said drill string.

11. The method as defined by claim 1, wherein said drill sting telemetry system is a hybrid telemetry system including a plurality of different types of telemetry media.

12. The method as defined by claim 1, wherein said control signals are received by a formation evaluation device.

13. The method as defined by claim 1, wherein said step of providing said drill string telemetry system comprises providing at least one repeater subsystem at a joint between drill pipes.

14. The method as defined by claim 1, wherein said step of transmitting said data via said at least a section of the string comprises transmitting said data on a carrier having a frequency of less than about 500 KHz.

15. The method as defined by claim 1, wherein said step of transmitting said data via said at least a section of the string comprises transmitting said data at a rate of at least 100 bits per second.

16. The method as defined by claim 1, wherein said control signals are received by a logging device.

17. The method as defined by claim 16, wherein said control signals include timing information to synchronize the uphole processor with the logging device.

18. The method as defined by claim 1, wherein said directional drilling subsystem comprises a rotary steerable system, and wherein said control signals comprise steering control signals for said rotary steerable system.

19. The method as defined by claim 1, wherein said directional drilling subsystem comprises an electrical lateral drilling tool, and wherein said control signals comprise steering control signals for said electrical lateral drilling tool.

20. The method as defined by claim 1, further comprising the steps of providing a surface interface between said drill string telemetry system and said surface processor, and providing surface measurement sensors in conjunction with said surface interface, said surface measured sensors comprising at least one sensor selected from the group consisting of a temperature sensor, pressure sensor, mud flow sensor, noise sensor, vibration sensor, torque sensor, acceleration sensor, and rotation sensor.

21. A method for obtaining and using measurement information comprising the steps of:
    positioning a deep-reading logging-while-drilling tool on a drill string, wherein at least a portion of the drill string comprises wired drill pipes inductively coupled;
    obtaining a measurement from the deep-reading logging-while drilling tool;
    transmitting the measurement to the surface in substantially real-time via the wired drill pipes; and
    changing a trajectory of the drill string based on the measurement.

22. The method of claim 21 wherein the deep-reading logging-while-drilling tool has tilted and transverse coils to obtain directionally sensitive measurements.

23. The method of claim 21 wherein the deep-reading logging-while drilling tool has at least three transmitters.

24. A method for obtaining and using measurement information comprising the steps of:
    positioning a drill string within a wellbore, the drill string comprising at least a portion of wired drill pipes inductively coupled to pass data therebetween;
    communicatively coupling an interface sub to a top portion of the wired drill pipes;
    obtaining a measurement characteristic of the drill string or the wellbore from a sensor on or within the interface sub; and
    transmitting a control signal to a tool connected to the drill string based on the measurement characteristic obtained from the sensor.

25. The method of claim 24 further comprising a hybrid telemetry system including a wired drill pipe telemetry system and at least one other type of telemetry system.

* * * * *